July 12, 1949.　　　　　V. V. KAMINSKY　　　　　2,476,098
INDICATING DEVICE

Filed Sept. 27, 1945　　　　　　　　　　　　　　2 Sheets-Sheet 1

SCALE I:　JAN. MAR. MAY. JULY. AUG. OCT. DEC.
SCALE II:　APRIL. JUNE. SEPTEMBER. NOVEMBER.
SCALE III:　FEBR.　SCALE IV. FEBR of LEAP YEAR.

| 24 | 25 | 26 | 27 | 28 | 29 | 30 | 31 | 32 | 33 | 34 | 35 |
|----|----|----|----|----|----|----|----|----|----|----|----|
|    |    |    |    |    |    |    |    |    |    |    |    |

CONTROL:

INVENTOR.
VICTOR V. KAMINSKY
BY
Hammond & Littell
ATTORNEYS

July 12, 1949.  V. V. KAMINSKY  2,476,098
INDICATING DEVICE
Filed Sept. 27, 1945  2 Sheets-Sheet 2
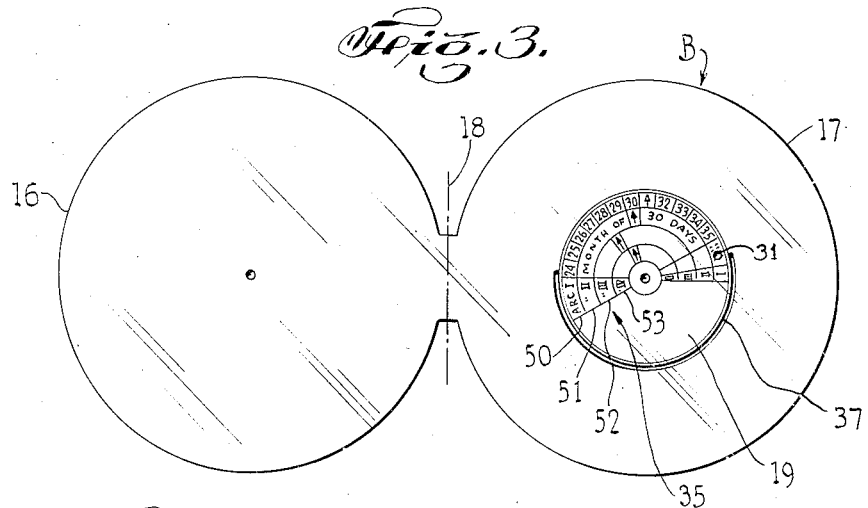
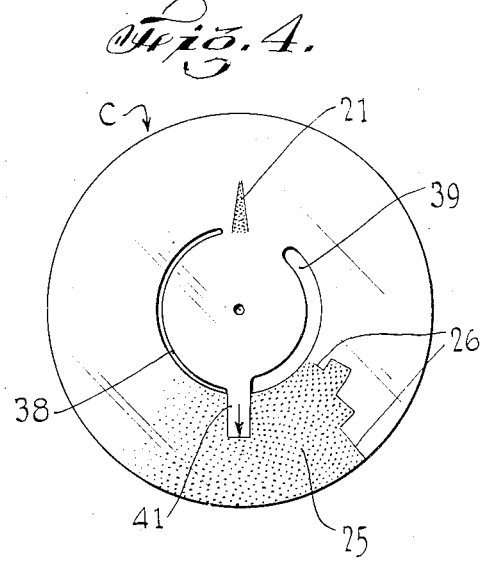
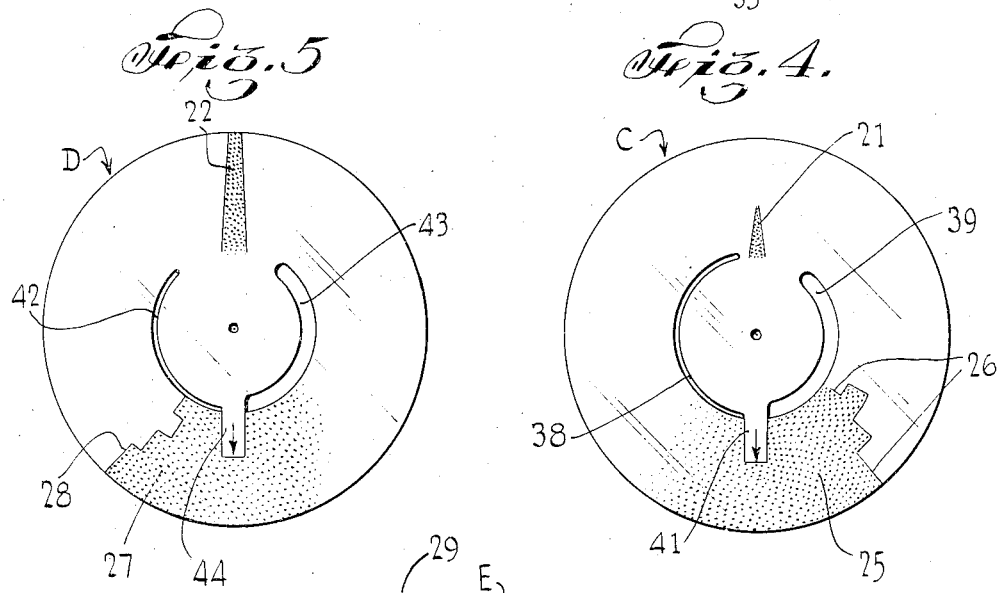
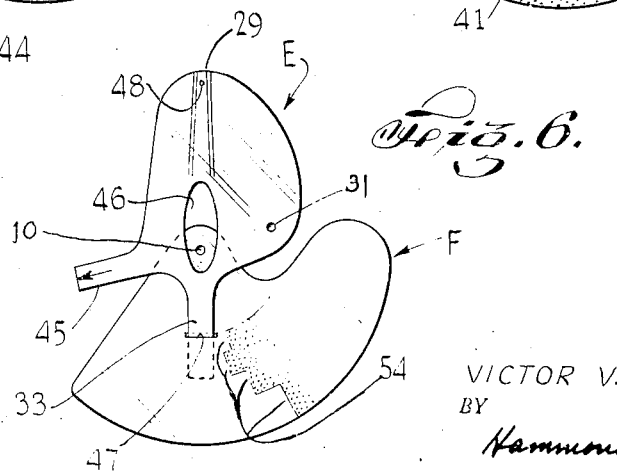
INVENTOR.
VICTOR V. KAMINSKY
BY
Hammond & Littell
ATTORNEYS Patented July 12, 1949

2,476,098

UNITED STATES PATENT OFFICE 2,476,098

INDICATING DEVICE

Victor V. Kaminsky, Saranac Lake, N. Y., assignor of one-half to Anatole Kaminsky, Los Angeles, Calif.

Application September 27, 1945, Serial No. 618,908

9 Claims. (Cl. 235—88)

This invention relates to indicating devices, and particularly to a date indicator for indicating the various phases of the human menstrual cycle.

One of the objects of the invention is to provide a simple, easily read indicator to show the next probable date of menstruation and the probable fertile period of the menstrual cycle of any particular person, fertile period meaning the calendar period in which conception is most likely to take place. The length of the fertile period is determined on the theory that ovulation takes place at a definite time during the menstrual cycle and that conception normally occurs only within a certain period of several days embracing the time of ovulation. The time preceding and following the fertile period may be termed the sterile period.

It is apparent that the fertile period changes if the menstrual cycle is irregular, and another object of this invention is to provide an indicator of the character mentioned having minimum and maximum reference marks which are adjustably settable to take into account irregularities of the menstrual cycle, together with means to account for irregularities in the lengths of calendar months, so as to indicate the earliest and latest dates when the next menstruation probably will occur and also the fertile period of the cycle.

Another object is to provide an indicator showing the period after menstruation begins in which marital relations are prohibited under the Law of Moses in the Hebrew religion.

In one form of the invention, a rotatable carrier or enclosure with indicia thereon is pivotally mounted on a fixed base and the carrier has a date pointer and a plurality of relatively adjustable flat reference mark carrying elements rotatable therewith. After the reference marks are set, the carrier may be turned to set the pointer at any appropriate position on a date scale provided on the base so that appropriate readings may be obtained from the resulting positions of the reference marks with respect to the date scale without the necessity of resetting and without disturbing their predetermined relative setting.

Another feature of the invention is the provision of a plurality of concentric circular date scales on the base member calibrated for varying lengths of calendar months and a pointer carrier co-operating with the several scales, said pointer carrier being eccentrically mounted relative to the pivot of the main rotatable carrier for the purpose of causing simultaneous movement of the pointer radially and angularly with respect to said scales, so that the pointer may be set to indicate the proper months scale to be referred to for each particular set of factual data, and so that the reference marks will indicate the calendar periods of day dates corresponding exactly to the periods desired to be indicated, when the main carrier has been set at a certain position with respect to said month scale in accordance with said data.

The main rotatable carrier is preferably transparent so that the date scales on the fixed base may be viewed therethrough. The various reference mark carrying elements mounted with the rotatable carrier also are preferably transparent, with the exception of segmental areas thereof for each date scale which preferably are shaded to show the fertile periods but through which the figures on the date scales may be read. The beginning or end of the shaded area for each particular scale is indicated by a radial line which is not aligned with the radial lines for adjacent date scales, so that there is little danger of reading the wrong scale. Said shaded areas and radial lines are located at fixed angular distances away from the minimum and maximum menstrual cycle reference marks. These distances on each date scale correspond to a fixed number of days on that scale, and the sum of those days plus the days indicated on that scale between the reference marks, for any particular relative setting of those marks will indicate a calendar period corresponding to the sterile period as herein defined. The shaded areas of the respective reference mark carrying elements preferably overlap to provide a total shaded area which will overlie a smaller or a larger arcuate portion of each date scale according to the relative setting of the reference marks, and this will indicate an appropriate "fertile period" as herein defined on that scale.

It is apparent that the principal features of construction of this invention may be used to determine or indicate information for purposes other than that served by the embodiment herein illustrated such as on a slide rule or other calendar or indicating devices. The above mentioned and other objects and features of the invention will become apparent from the following description and from the drawings in the illustration thereof, all of which are merely exemplary.

In the drawings:

Fig. 3 shows the main rotatable carrier or enclosure before it is folded into enclosing position.

Fig. 4 shows one of the reference carrying elements.

Fig. 5 is a view of a second reference carrying element.

Fig. 6 is an assembly view of the eccentrically mounted date pointer carrying element.

Figure 1:
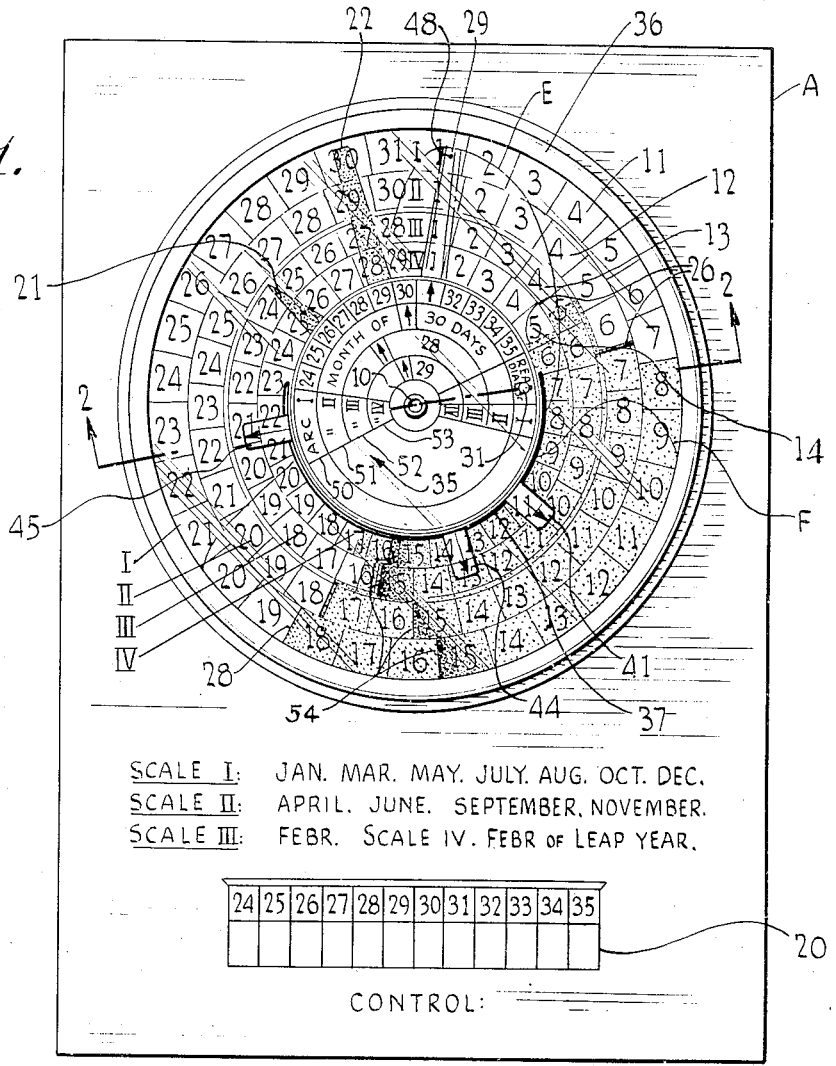
Fig. 1 is an assembled view of the device.

In general, in a preferred form of the invention, there is a fixed base A of cardboard or similar material upon which is located a plurality of circular fixed date scales 11, 12, 13, and 14. A rotatable carrier or enclosure B is pivoted at 10 over said date scales, said rotatable enclosure being preferably of celluloid or a similar transparent material. The rotatable carrier B has menstrual cycle indicia 35 (Figs. 1 and 3) thereon comprising a group of concentric scales 50, 51, 52, and 53 with numerals to indicate appropriate numbers of days, and arrows useful for a purpose hereinafter described.

A short reference mark 21, which may take the form of an arrow, is on a transparent carrier element C pivoted with the rotatable enclosure B. Element C has a tab or handle 41 by which the mark 21 may be set opposite any of the numerals among the indicia 35 on rotatable carrier B. The numeral to be selected for this setting is to be determined by observations as corresponding to the minimum number of days in any of the menstrual cycles of the user.

On the same element C, there are radial lines 26 for the respective date scales bordering a shaded area 25 overlying all of these scales, the radial lines being spaced a predetermined number of days from the reference mark 21 based on the theoretical time interval between the beginning of a menstruation and the beginning of the next fertile period.

A second reference mark carrying element D having reference mark 22 thereon is pivoted with said rotatable carrier B and is settable relative thereto so as to position mark 22 at a numeral among indicia 35 corresponding to the maximum observed menstrual cycle. Element D has a tab or handle 44 for setting purposes. Radial lines 28 and a shaded area 27 on element D are located a predetermined angular distance in a date decreasing direction from the maximum reference mark 22, to show the end of the fertile period in relation to the underlying date scales 11, 12, 13 and 14. As the minimum and maximum reference marks are moved to wider angles of separation, the radial lines 26 and 28, respectively showing the beginning and the end of the fertile period, will become farther separated, thus producing a larger total shaded area and indicating a longer period within which conception might take place.

A date element E carrying a date pointer 29 is mounted on the rotatable carrier for rotation eccentrically with respect thereto, on a pivot 31 when moved by a tab or handle 45. Said date element thus can be set opposite an arrow of the carrier indicia 35 that corresponds to a month and has the same number of days as the month in which the last menstruation period of the user began. As the date element is mounted eccentrically, its pointer 29 will move radially and angularly relative to the carrier pivot 10, so that a mark on the pointer can be arranged to indicate the proper date scale to be read in connection with a month of the said number of days, and thus the difference in number of days in the month will be compensated thereby. The date pointer co-operates with a sector F pivoted concentrically with the main carrier at 10, said sector having radially extending lines 54 overlying the respective date scales 11, 12, 13, and 14, which lines are each spaced angularly from pointer 29 a distance corresponding to fourteen days on the particular date scale concerned.

Considering the illustrated embodiment in further detail, fixed base A has four circular date scales 11, 12, 13, and 14, said scales being divided into 31, 30, 28, and 29 days respectively, said scales being marked with Roman numerals I, II, III, IV. The base also may have thereon a list of the months for which the respective scales are to be used.

Control tabulation 20 has a series of squares superimposed by numerals corresponding to the numbers of days that may elapse in human menstrual cycles. The user may observe the length of her cycles over a period of several months and place a mark each time in the appropriate square, and from this her minimum and maximum cycles can be determined at a glance.

Figure 2:
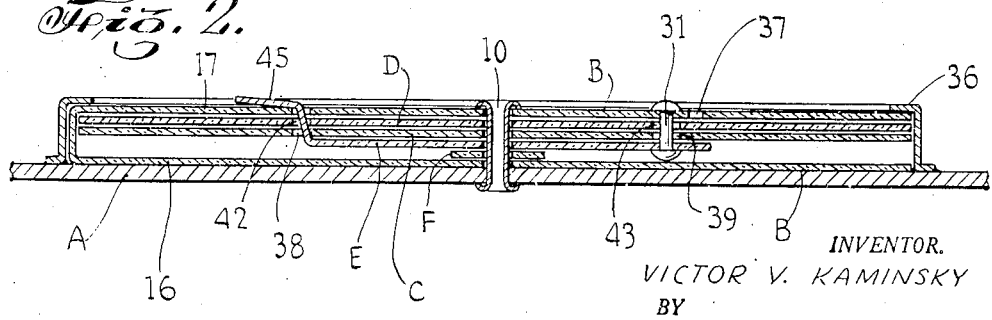
Fig. 2 is a vertical cross-section taken along line 2—2 of Fig. 1.

A rotatable carrier or enclosure B (Figs. 2 and 3) is pivoted at 10 to the fixed base A and the edges thereof may be engaged and guided in the channel shaped annular guide 36 fixed to the base. The rotatable carrier B is made of a material such as celluloid and can be cut from a single piece, as seen in Fig. 3, with a bottom portion 16 and upper portion 17. Indicia 35 located on the carrier includes arcuately disposed numerals corresponding to the numerals on the control tabulation 20. In addition, there is an arrow in place of numeral 31 on the scale 50, and the date pointer 29 is to be set in registry with this arrow when a 31-day month is involved. Three other arcuate scales 51, 52 and 53, respectively have arrows at 30-day, 28-day, and 29-day month positions, and there may be markings in Roman numerals to show which of the corresponding circular date scales 12, 13, and 14 on base A is to be used. An arcuate slot 37 is provided for the passage of the tabs or operating handles 41, 44 and 45 of the various settable indicating elements C, D and E, as described more particularly hereinafter.

A minimum menstrual cycle reference carrying element C has an arrow 21 thereon and a series of radial lines 26 with a shaded transparent area 25 extending from said lines in a date increasing direction angularly from reference mark 21. The angular distance is chosen for each scale so that the number of days between the pointer and the radial line is indicative of the beginning of the fertile period after the beginning of menstruation. The disc preferably is of the same material as the carries and is transparent with the pointer and shaded area transparently shaded a suitable color, such as red. Slit 38 is provided for passage of tabs from the other reference mark carriers and slit 39 straddles pivot 31 which will be described hereafter. In assembled position, tab 41 extends through slit 37 of the rotatable carrier B.

The maximum menstrual cycle carrying element or disc D has a reference mark 22 and radially extending lines 28 with a shaded area 27, said lines and shaded area being spaced angularly from mark 22 in a date decreasing direction corresponding to the end of the fertile period relative to the reference mark. Disc D has slits 42 and 43 similar to disc C together with an operating tab 44. The disc D is assembled on the rotatable carrier B in a manner similar to that described for C.

Date pointer 29 is mounted on pointer carrier segment-like element E, said segment being made of transparent material and having an operating tab which can be extended through slits 37, 38, and 42. The segment is pivoted at 31 (Figs. 1, 2, 3, and 6) on the rotatable carrier B and has an elongated aperture 46 through which main pivot 10 passes. Reference mark carrying sector F has radially extending lines 54 and shaded areas, which may be black, thereon for indicating 14 days after the date pointer on the particular scale for which it is set. Projection 33 engages slidingly in aperture 47 for the purpose of rotating sector F in the same direction as date pointer 29 as the tab 45 is operated. Date pointer 29 can have an indicating dot 48 which moves radially relative to the pivot 10 as segment E is rotated on pivot 31. The date pointer is rotated to a point opposite an appropriate arrow of carrier indicia 35 and as a result the dot will be moved over the date scale 11, 12, 13, or 14 to be used. Inasmuch as the pointer moves angularly, the sector also is moved angularly to maintain the same angular relationship between the pointer and the radial lines 54.

The above described parts B, C, D E and F comprise the movable assembly. Disc 16 of the carrier B is bent along the line 18 to close the carrier B and is secured to the base A by an eyelet through all the pivot apertures 10 in a manner so as to permit assembly B to rotate freely about its center.

In a regular menstrual cycle, according to Doctors Ogino and Knaus, the fertile period during which conception may take place extends through eight days, and each day of irregularity thereof adds one day to the probability of possible conception. It is to be noted that as the interval between the reference marks 21 and 22 is varied, the area of shaded field of the co-acting areas 25 and 27 is varied correspondingly. For example, with an interval of two days between the marks 21 and 22, the shaded field 25, 27 covers ten days, and with an interval of three days between marks, the shaded field covers eleven days. When the arrows 21 and 22 coincide, the red field covers eight days. The long reference mark 22 represents the longest cycle while the small reference mark 21 represents the shortest cycle, so that with the marks coinciding, the cycle is a regular one in which case the shaded field covers only eight days.

The mechanical ability of the calendar to provide correct information depends on the correct positioning of the arrows 21, 22, and 29 within the assembly against the numbers of the carrier indicia 35 and afterwards upon a correct positioning of arrow 29 against the appropriate number on the appropriate date scale of base A. While the marks 21 and 22 are positioned against the appropriate numbers on the indicia 35 corresponding to the lengths of the cycles, and the date pointer 29 is set against the number representing the length of the month, it becomes apparent that the relationship between the arrows remains constant while the rotatable carrier B is turned on the base A because the marks carried thereby will turn therewith and therefore indicate correctly the dates desired.

The mark 21 is set opposite the number on scale 50 representing the shortest menstrual cycle and mark 22 is set opposite the number on scale 50 representing the longest menstrual cycle. Then, if the month on which the first day of menstruation occurred has 31 days, the pointer 29 is positioned against the small arrow on scale 50 which stands for number 31, then the entire carrier B is turned until the pointer 29 points to the date on which menstruation started, which, of course should be sought on scale I of base A, and the desired information read can be on the same scale. If one of the arrows, or both, or the shaded area should pass the number 31 of the said scale and overlap into number 1, 2, 3, etc. it means that the dates are of the next month.

If the month on which menstruation started has 30 days the date pointer 29 should be positioned against number 30 of scale 50, or which is the same, the small black arrow on scale 51. When the date pointer 29 is aligned with the number 30, on scale 51, the black dot 48 on the said pointer 29 will move downward over scale II of base A, thus clearly indicating that scale II of base A should be read for the desired information.

When the calendar is to be set for a month of 28 days, the date pointer 29 is moved against the number 28 of scale 52 and will automatically move down at the same time so that the black point 48 of the pointer 29 will be in the center of scale III (13 of fixed base A) thus again leading the attention of the user to the proper scale which is to be read.

When the date pointer 29 is placed against the number of indicia 35 it should be centered exactly in the numbered space, it being noted that with such an accurate centering of the pointer 29 in the numbered space, and with reference mark 21 and 22 likewise accurately set in their corresponding places against the number-spaces of the arc I, the shaded area 25, 27 will have its borders coincide accurately with the borders of the numbered spaces of the scales of the base A. but only for one scale for which the point 29 has been set, the other borders remaining out of alignment with the borders of the numbered spaces of the rest of the scales.

In order to illustrate the mode of operating the device, an example is seen in the setting of the parts shown in Fig. 1. Using as an example an average cycle varying between 26 and 29 days, the maximum cycle reference mark 22 is lined up with the number 29 of the scale 50 on carrier B, such alignment being effected by moving the tab 44. The minimum cycle reference mark 21 is then aligned with the number 26 of the same scale 50 by moving tab 41. Assuming that the month in which menstruation first began contains 31 days, the date pointer 29 is positioned against the small black arrow corresponding to number 31 of arc I of the rotatable carrier B. Assuming that the present menstruation started on the first of the month, the carrier B is turned on the stationary base A until the arrow 29 is centered against number 1 of scale I of base A.

The reference mark 22 will point to the date upon which the next menstruation can be expected at the latest. The short reference mark 21 will point to the date on which the next menstruation can be expected at the earliest, the dates being the 30th and the 27th of the same month, respectively. The position of the irregular black line 54 will indicate the date when marital relations may be resumed in conformity with the law of Moses, this being the 16th.

It is important that all readings be taken on the scale of base A to which the pointer 29 is set on the indicia 35 of carrier B. It also should be noted that the setting of the pointer 29 relative to a scale of indicia 35 of carrier B is always for the same month in which the first sign of menstruation takes place.

To the latter setting there is one exception, and that is when the longest cycle is of 31 days duration or longer, and the first sign of menstruation occurs near the end of a month. If the succeeding month is of a shorter duration than the cycle, the succeeding data might occur in the early days of a month following. Thus, when a full month will be skipped and a true reading desired for the date on which the oncoming menstruation may be expected at the latest, the setting of the calendar is slightly different from the one described. In such a case, the pointer 29 is positioned in the housing B not for the same month on which the period began, but for the month following it. The pointer 29 is then set to the date on which the period started on the scale for a month on which the period actually occurred, as usual, and all the readings are taken from the scale to which the pointer 29 was set in the carrier B, as designated for normal reading.

From the foregoing, it will be understood that once the duration of the cycles, both maximum and minimum, have been established, the calendar may be readily used to indicate the date or dates between which the next period may be expected, and correspondingly the fertile and sterile periods of any given cycle, regardless of the length of the month. To those following Hebrew religion the date on which marital relations may be resumed will also be indicated.

Various modifications may be made in the specific construction and manner described for carrying out the invention without departing from the spirit of the invention or the scope of the appended claims.

I claim:

1. A date indicator comprising a fixed base with date scales thereon; a rotatable carrier pivotally mounted on said base, said carrier having indicia thereon; a plurality of reference mark carrying elements mounted with said carrier and settable relative to each other and said carrier in co-operation with said carrier indicia; an indicating element pivoted on said carrier eccentrically relative to the carrier pivot, said element having a date pointer thereon to co-operate with said scales and means to move said indicating element about its pivot to move said date pointer simultaneously angularly and radially relative to the carrier pivot, said reference mark carrying elements and indicating element being rotatable with said carrier as the carrier is rotated to bring said date pointer to a particular date, said reference marks cooperating with said date scales to indicate spaced dates relative to said date pointer.

2. An indicator comprising a fixed base with scales thereon; a rotatable carrier pivotally mounted on said base; an indicating element pivoted on said carrier eccentrically relative to the carrier pivot, said element having a pointer thereon to co-operate with said scales; means to move said element about its pivot to move said pointer simultaneously angularly and radially relative to the carrier pivot; a reference mark carrying element pivotally mounted with said carrier; and connecting means between said indicating element and reference mark carrying element to move said pointer and reference mark relative to each other as the indicating element is rotated about its pivot to maintain a predetermined angular distance between said pointer and reference mark.

3. A date indicator comprising a fixed base with a plurality of concentric date scales for months of varying length; a rotatable carrier pivotally mounted on said base, said carrier having indicia; a date pointer element pivoted on said carrier eccentrically relative to the carrier pivot, said date pointer being simultaneously movable angularly and radially relative to the carrier as the date pointer element is rotated; a reference mark sector pivotally mounted with said rotatable carrier; an interconnection between said date pointer element and sector to move the element and sector relative to each other as the pointer is moved relative to the carrier; a pair of reference mark carrying elements pivotally mounted with said carrier and settable relative to each other and said carrier in co-operation with said carrier indicia, said reference mark carrying elements being rotatable with said carrier as the date pointer is set and co-operating with said date scales to indicate spaced dates relative to said date pointer.

4. A date indicator comprising a fixed base with a plurality of concentric circular date scales thereon; a rotatable transparent carrier pivotally mounted on said base, said carrier having indicia thereon; a pair of transparent discs pivotally mounted within and coaxially with said carrier, said discs having reference marks thereon and having tabs extending exteriorly of the carrier for setting said reference mark carrying elements relative to the carrier indicia and to each other; a date pointer element pivotally mounted eccentrically relative to the carrier pivot, said eccentrically mounted date pointer being movable angularly and radially as it is rotated about its pivot, there being a tab extending exteriorly of the carrier for operation thereof, said date pointer and reference mark carrying elements being co-operable with said date scales through the transparent carrier to indicate spaced dates relative to said date pointer.

5. A date indicator comprising a fixed base with a plurality of concentric circular date scales thereon; a rotatable transparent carrier pivotally mounted on said base, said carrier having indicia thereon; a pair of transparent discs pivotally mounted within and coaxially with said carrier, said discs having reference marks thereon and having tabs extending exteriorly of the carrier for setting said reference marks relative to the carrier indicia and to each other; a date pointer element pivotally mounted eccentrically relative to the carrier pivot so that the date pointer moves angularly and radially as it is rotated about its pivot; a tab on said date pointer element extending exteriorly of the carrier for operation of said pointer; a reference mark carrying sector within and rotatable coaxially with said carrier; an interconnection between said date pointer element and said sector to turn said sector as the date pointer is moved angularly and radially; and radial marks and shaded areas extending arcuately therefrom on their respective reference mark carrying discs and sector, said radial marks respectively being spaced angularly a predetermined distance from their respective reference marks and pointer for indicating dates on said date scales through the transparent carrier.

6. An indicating device comprising a base having a plurality of concentric circular date scales thereon corresponding to months of varying length; a rotatable enclosure pivoted thereon through which the scales are visible, said enclosure having indicia arranged arcuately thereon to represent menstrual cycles of progressive lengths, a transparent disc rotatable with said enclosure and having a reference mark settable at the shortest cycle indicia and having an arcuate shaded area beginning at an angular distance from said mark corresponding to the theoretical interval between the beginning of a menstruation and the beginning of the next fertile period; a second transparent disc rotatable with said enclosure and having a reference mark settable at the longest cycle indicia and having an arcuate shaded area ending at an angular distance from its reference mark corresponding to the theoretical interval between the beginning of a menstruation and the end of the next fertile period; and a date pointer rotatable with said enclosure so as to point to any angular part of said scales and adjustably settable with respect to said indicia on said enclosure so as to point to any appropriate one of said scales; and means including a pivot for said date pointer eccentrically disposed with respect to the enclosure pivot whereby the date indicator moves radially and angularly relative to said enclosure to effectuate the adjustable settings thereof.

7. A date indicator comprising a fixed base with a plurality of substantially concentric date scales thereon; a rotatable carrier pivotally mounted on said base, said carrier having indicia thereon; a plurality of reference mark carrying elements mounted with said carrier and settable relative to each other and said carrier indicia; a date pointer element pivoted on said carrier eccentrically relative to the carrier pivot, said element having a date pointer thereon, and means to move said element about its pivot to move said date pointer angularly and radially relative to said carrier indicia to co-operate with said indicia and said date scales, said reference mark carrying elements and the date pointer element being rotatable with said carrier as a unit after the elements have been set relative to said carrier, as the carrier is rotated to bring said date pointer to a particular date on one of the date scales, said reference marks co-operating with said date scales to indicate spaced dates relative to said date pointer.

8. A date indicator comprising a fixed base with date scales thereon; a rotatable carrier pivotally mounted on said base, said carrier having indicia thereon; a pair of mark carrying elements mounted with said carrier; a date pointer element pivoted on said rotatable carrier eccentrically relative to the carrier pivot, said element having a pointer thereon to co-operate with said carrier indicia and said date scales; means to move said element about its pivot to move its pointer angularly and radially relative to carrier indicia in accordance with varying lengths of a month; a reference mark carrying sector pivotally mounted with said rotatable carrier; and connecting means between said date pointer element and said sector to move the date pointer and sector reference mark relative to each other as the date pointer element is rotated about its pivot whereby to maintain a predetermined angular distance between said pointer and said sector reference mark.

9. A date indicator comprising a fixed base with a plurality of concentric circular date scales thereon corresponding to months of varying length; a rotatable transparent carrier pivotally mounted on said base through which the scales are visible, said carrier having indicia arranged arcuately thereon to represent menstrual cycles of progressive lengths; a transparent disk pivotally mounted with said carrier and having a reference mark settable at the shortest cycle indicia of said carrier and having an arcuate shaded area beginning in a date decreasing direction a predetermined angular distance from its reference mark at a theoretical interval between the subsequent menstruation and the beginning of the fertile period; a second transparent disk pivotally mounted with said carrier and having a reference mark thereon settable at the longest cycle indicia of said carrier and having an arcuate shaded area ending in a date decreasing direction at an angular distance from its reference mark corresponding to the theoretical interval between the beginning of a subsequent menstruation and the end of a fertile period; and a date pointer element mounted on said carrier eccentrically relative to the carrier pivot and movable angularly and radially relative to said carrier indicia, said date pointer to be set in co-operation with said carrier indicia for a length of a month and simultaneously to point to the corresponding date scale on said base, said date pointer being rotatable with said carrier as the carrier is rotated to set said date pointer on any desired angular part of said date scales on the base, such setting when effected bringing the reference marks on said transparent disks to indicate dates on said date scales when the next menstruation is likely to take place, and said shaded areas on said transparent disks to indicate the dates for the probable fertile period for such setting.

VICTOR V. KAMINSKY.

REFERENCES CITED

The following references are of record in the file of this patent:

UNITED STATES PATENTS

| Number | Name | Date |
|---|---|---|
| 284,270 | Brenner | Sept. 4, 1883 |
| 429,949 | Palmersten | June 10, 1890 |

Certificate of Correction

Patent No. 2,476,098.                                                                                                  July 12, 1949.

VICTOR V. KAMINSKY

It is hereby certified that error appears in the printed specification of the above numbered patent requiring correction as follows:

Column 10, lines 47 and 48, strike out the words and comma "and said shaded areas on said to take place,";
and that the said Letters Patent should be read with this correction therein that the same may conform to the record of the case in the Patent Office.

Signed and sealed this 29th day of November, A. D. 1949.

[SEAL]

THOMAS F. MURPHY,
*Assistant Commissioner of Patents.*